United States Patent [19]
Rudel et al.

[11] Patent Number: 6,049,304
[45] Date of Patent: Apr. 11, 2000

[54] METHOD AND APPARATUS FOR IMPROVING THE ACCURACY OF RELATIVE POSITION ESTIMATES IN A SATELLITE-BASED NAVIGATION SYSTEM

[75] Inventors: Marc-Philippe Rudel; Jonathan C. Baldwin, both of Alexandria, Va.

[73] Assignee: Rannoch Corporation, Alexandria, Va.

[21] Appl. No.: 08/891,227

[22] Filed: Jul. 10, 1997

[51] Int. Cl.[7] ................................................ G01S 5/03
[52] U.S. Cl. ............................ 342/357.08; 701/213
[58] Field of Search ................................ 342/357, 455, 342/357.08, 357.12; 701/213

[56] References Cited

U.S. PATENT DOCUMENTS

| | | | |
|---|---|---|---|
| 5,596,332 | 1/1997 | Coles et al. | 342/455 |
| 5,680,140 | 10/1997 | Loomis | 342/357 |
| 5,781,150 | 7/1998 | Norris | 342/357 |

OTHER PUBLICATIONS

Rudel, Marc–Philippe, Baldwin, Jonathan, "GPS Relative Accuracy for Collision Avoidance", Navigation Technical Meeting in Santa Monica, California, Jan. 1997.

Baldwin, Jonathan, "Traffic Alert System Technical Design Summary", Apr. 1994.

*Primary Examiner*—Gregory C. Issing
*Attorney, Agent, or Firm*—Greenberg Traurig; Robert P. Bell

[57] ABSTRACT

The accuracy of relative position estimates between two vehicles, generated using a satellite-based navigation system, is improved by eliminating at an early stage in the calculation process, errors affecting simultaneously both receivers. The standard absolute navigation equations are modified to solve directly for relative position, while avoiding a final step differentiation, thereby providing increased precision.

52 Claims, 2 Drawing Sheets

Structure of the computation algorithm

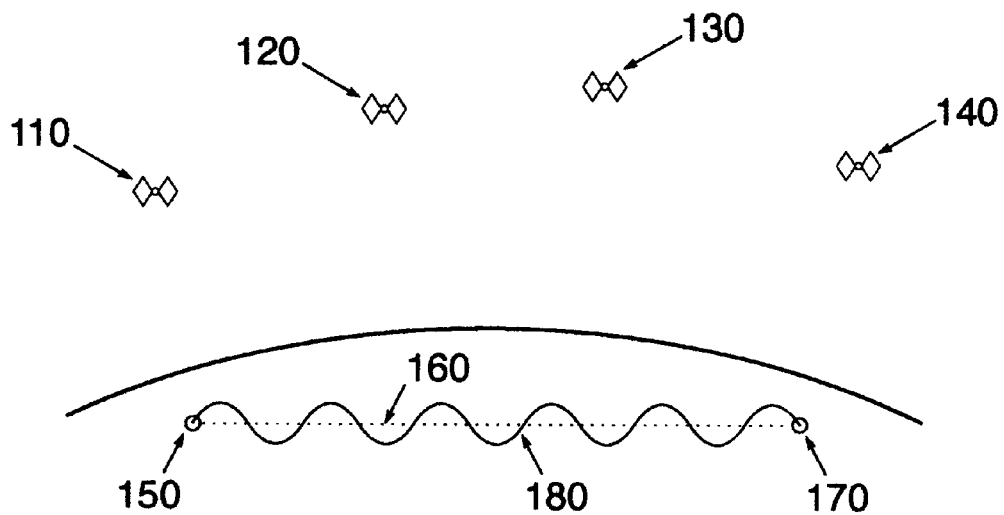
Figure 1: User-satellites geometry
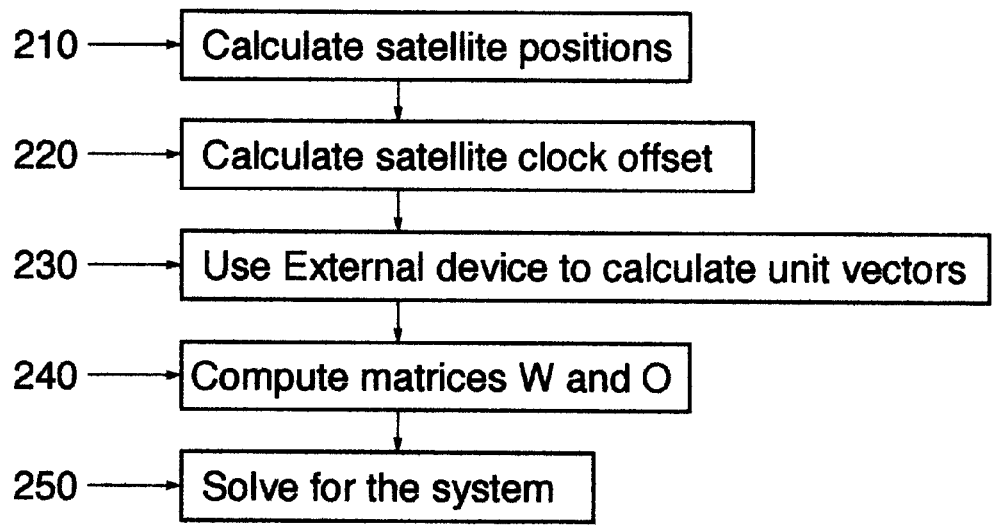
Figure 2: Structure of the computation algorithm

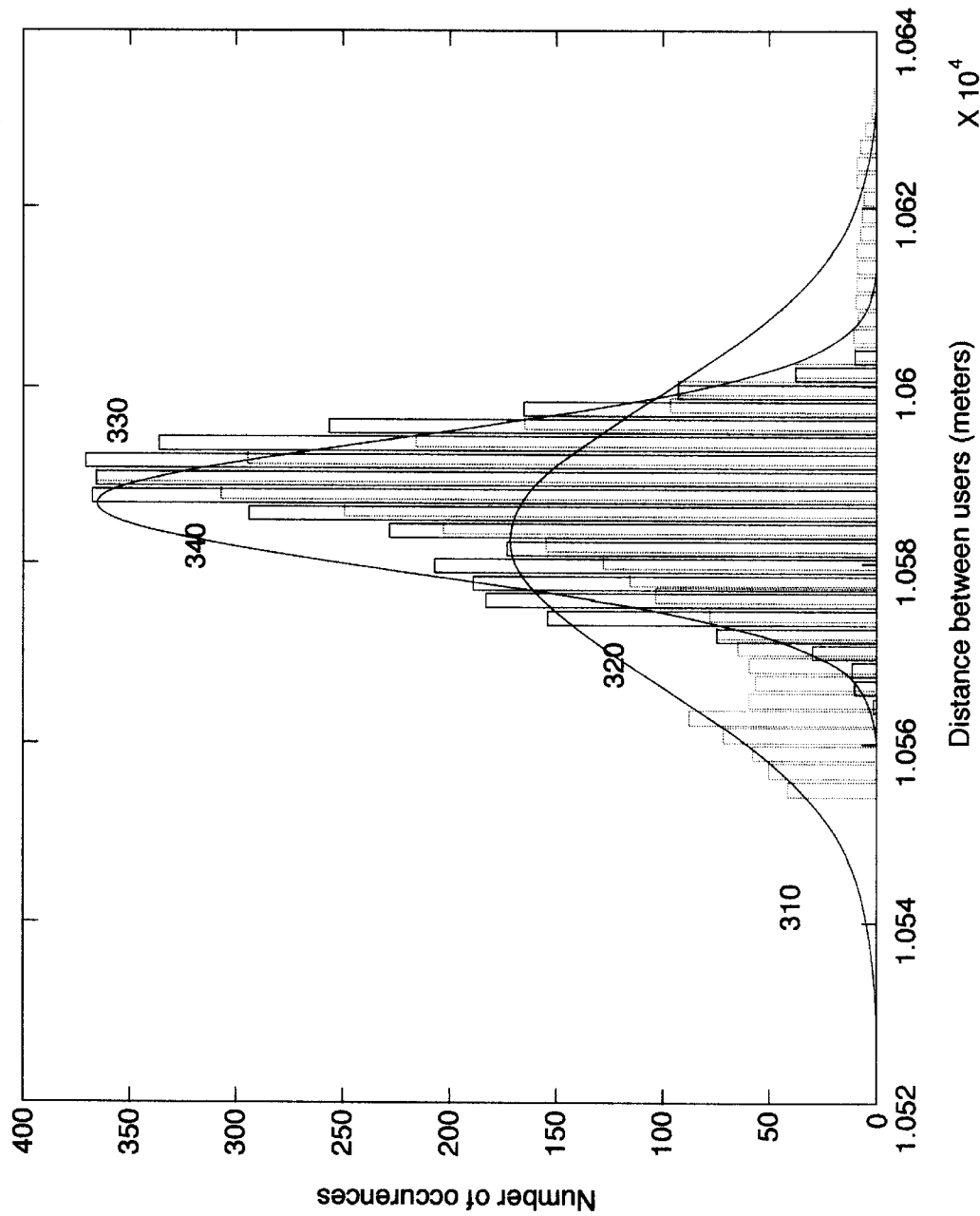

METHOD AND APPARATUS FOR IMPROVING THE ACCURACY OF RELATIVE POSITION ESTIMATES IN A SATELLITE-BASED NAVIGATION SYSTEM

CROSS-REFERENCES TO RELATED APPLICATIONS

Not applicable.

STATEMENT REGARDING FEDERALLY-SPONSORED RESEARCH OR DEVELOPMENT

Not applicable.

REFERENCE TO A MICROFICHE APPENDIX

Not applicable.

BACKGROUND OF THE INVENTION

This invention relates generally to the field of navigation systems which use a constellation of earth-orbiting satellites to determine the relative position between two users located on or near the earth's surface. More specifically, the invention depicts a method and apparatus for improving the accuracy of relative position estimates in such a satellite-based navigation system. It also relates to the field of collision avoidance as the knowledge of such accuracy is a key factor in preventing mid-air and ground collisions. Several satellite-based navigation systems are currently used by the worldwide community. For ease of discussion, the following disclosure will specifically focus on the NAVSTAR Global Positioning System (GPS) operated and maintained by the Department of Defense. This system, which is used for navigation, position determination and time-transfer applications, consists of a 24-satellite constellation. Each of them radiates precisely timed signals coded so that a receiver on or near the earth's surface can determine both the transmission time delay (or equivalently, distance) from the satellite to the receiver and the precise satellite position. By simultaneously receiving such signals from at least four satellites, the receiver can determine its position and time.

However, several sources or errors adversely affect the accuracy of such determination. These errors are primarily due to:

satellite ephemeris uncertainties (lack of precision in the satellite position on its pre-determined orbit)

selective availability (deliberate degradation of the signals by the Department of Defense for non military users)

ionospheric and tropospheric propagation delays satellite and receiver clock drifts multipath (multiple reflexion and scattering of a signal)

receiver noise.

Although the differentiation of two nearby receivers' absolute positions (i.e., calculated independently one from the other) enables one to partly eliminate some of these errors, this type of post-processing, abundantly shown in the prior art, is by essence unable to attain the accuracy of a direct relative positioning method, cancelling out at the source errors common to both receivers. Accordingly, what is needed is a new method solving directly for the relative position of two users so that the accuracy of such position is improved.

BRIEF SUMMARY OF THE INVENTION

The invention is an apparatus and method for use with a satellite-based navigation system. Its purpose is to improve the accuracy of relative position estimates by accounting for errors common to both receivers. In an embodiment featuring the Global Positioning System (GPS), all satellites in view by both receivers are used to calculate the relative position vector. The fundamental GPS equation system is modified in such a fashion so as to solve directly for the relative position of the two receivers in an earth-centered, earth-fixed (ECEF) system of coordinates.

BRIEF DESCRIPTION OF THE DRAWINGS

FIG. 1 is a diagram depicting a typical geometry featuring two nearby aircraft separated by an unknown distance and the four satellites that both of them have in view.

FIG. 2 is a block diagram describing the operations that need to be performed during the post-processing in order to calculate the relative position of said two aircraft.

FIG. 3 is a graph illustrating relative versus absolute navigation performance.

DETAILED DESCRIPTION OF THE INVENTION

The present invention is now described with reference to the figures where like reference numbers denote like elements/steps.

In the preferred embodiment, the NAVSTAR Global Positioning System is used. As previously mentioned, the system includes twenty-one operational and three spare satellites which orbit the earth in six orbits. The invention is described in the environment of two proximate aircraft 150 and 170 separated by an unknown distance 160, as shown in FIG. 1. A representative GPS constellation includes four GPS satellites 110, 120, 130 and 140 for transmitting GPS data. This configuration was adopted for the sake of clarity. In reality, both aircraft can have "in view", i.e., receive signals from up to nine satellites. Communication link channel 180 represents the communications link between aircraft 150 and 170. In the preferred embodiment, communication channel 180 has an Automatic Dependent Surveillance-Broadcast (ADS-B) capability. ADS-B has been described in numerous instances in the prior art. Communication channel 180 is used to transfer data, specifically position and time between aircraft 150 and aircraft 170. The GPS constellation comprising satellites 110, 120, 130 and 140 may optionally include one or more pseudolites. A pseudolite or "pseudo-satellite" is a transmitting system located on the earth's surface which emulates a GPS satellite. Because a pseudolite has a fixed, known position, it can greatly enhance the relative position estimates derived from GPS. For ease of discussion herein, only GPS satellites will be referenced. It should be understood however, that where position data from a satellite is required, pseudolite data may be substituted.

The equipment used in the preferred embodiment to record GPS data includes two 12 parallel channel receivers (GPS 25 XL), mounted on aircraft 150 and 170, as well as two antenna kits (GA 27A) available from Garmin, each of which is linked to one of the receivers.

GPS signals, broadcast every second, contain ephemeris data, i.e. several sets of parameters characterizing each of the predetermined orbits satellites are constrained to move on, GPS time by means of which precise satellite positions can be determined. By noting the time at which signals are received, GPS receivers can compute the propagation time delay or equivalently (by multiplying by the speed of light) the estimated distances between satellites and receivers also denoted as raw pseudoranges. This terminology reflects the fact that those measurements are only an approximation of the true distances, the integrity of which is corrupted by different sources of errors as described in the section devoted to the background of this invention.

Ephemeris data, GPS time and raw (i.e. uncorrected) pseudoranges are the key elements to determine relative position 160 between aircraft 150 and 170. The post-processing operations on which this invention is founded are illustrated in a flow chart shown in FIG. 2. The first step consists in calculating the satellite position in the ECEF (earth-centered, earth-fixed) reference frame. A preexisting algorithm can be found in the second edition of the *Global Positioning System Standard Positioning Service Signal Specification* dated June 1995. This algorithm however superfluously introduces the functions $\cos^{-1}$ and $\tan^{-1}$, the use of which may be critical for values at the boundary of the definition domain. A modified version of this algorithm represented by step 210 overcomes this issue by using only the sine and the cosine of both the true anomaly, $v_k$, and argument of latitude, $\phi_k$ defined as follows:

$$\cos v_k = \frac{\cos E_k - e}{1 - e \cos E_k}$$

$$\sin v_k = \frac{\sqrt{1-e^2}\sin E_k}{1 - e \cos E_k}$$

$$\cos\phi_k = \cos v_k \cos\omega - \sin v_k \sin\omega$$

$$\sin\phi_k = \sin v_k \cos\omega + \sin\omega \cos v_k$$

where $k \in \{1, \ldots, 6\}$, e denotes the eccentricity of the elliptical orbits, $E_k$ and $\omega$, the eccentric anomaly and argument of perigee respectively. By further using the relations:

$$\begin{cases} \sin 2\phi_k = 2\sin\phi_k(\cos\phi)_k \\ \cos 2\phi_k = 1 - 2\sin^2\phi_k \end{cases}$$

the second harmonic perturbations (corrections made to orbit parameters such as the argument of latitude, radius and inclination) are thus computed while avoiding any problem of definition in the mathematical sense.

At step 220, the satellite clock correction function is performed. At step 230, an external position device such as an inertial reference unit is used to calculate an initial estimate of the unit vectors (which characterize the direction) between aircraft and satellites. The matrices featured at step 240 represent the quintessence of this invention. Their calculation is presented in what follows.

The true distance between aircraft 150 and 170 and the satellites they have in view can be expressed as:

$$A_1 S_{1,i} = \rho_{1,i} - e_1 - e_{1,i} \tag{1}$$

$$A_2 S_{2,j} = \rho_{2,j} - e_2 - e_{2,j} \tag{2}$$

In the preferred embodiment i and j were chosen to vary between 1 and 4. It must be understood however that the present study remains valid in the general case when i, resp. j, varies between 1 and n, resp. p, n and p being the total number of satellites each of them has in view. In Eq. (1) and (2), $A_1$ denotes the position of aircraft 150, $S_{1,i}$, the position of the $i^{th}$ satellite it has in view; similarly, $A_2$ denotes the position of aircraft 170, $S_{2,j}$, the position of the $j^{th}$ satellite it has in view. $\rho_{1,i}$ and $\rho_{2,j}$ are pseudoranges reported from the satellites to each aircraft. Lastly, $e_1$ and $e_2$ represent the range equivalents of each aircraft clock offsets; $e_{1,i}$ and $e_{2,j}$, the range equivalents of the satellite clock offsets.

Position vectors $\overrightarrow{OA_1}$ between earth's center O and aircraft 150 and $\overrightarrow{OA_2}$ between earth's center O and aircraft 170 can be decomposed as:

$$\overrightarrow{OA_1} = \overrightarrow{OS_{1,i}} + \overrightarrow{S_{1,i}A_1} \tag{3}$$

$$\overrightarrow{OA_2} = \overrightarrow{OS_{1,i}} + \overrightarrow{S_{1,i}A_1} \tag{4}$$

By further introducing unit vectors:

$$\overrightarrow{u_{1,i}} = \frac{\overrightarrow{A_1 S_{1,i}}}{A_1 S_{1,i}} \text{ and } \overrightarrow{u_{2,j}} = \frac{\overrightarrow{A_2 S_{2,j}}}{A_2 S_{2,j}}$$

calculated at step 230, the following equations are obtained:

$$\overrightarrow{u_{1,i}} \cdot \overrightarrow{OA_1} = \overrightarrow{u_{1,i}} \cdot \overrightarrow{OS_{1,i}} - A_1 S_{1,i} \tag{5}$$

$$\overrightarrow{u_{2,j}} \cdot \overrightarrow{OA_2} = \overrightarrow{u_{2,j}} \cdot \overrightarrow{OS_{2,j}} - A_2 S_{2,j} \tag{6}$$

Vectorial Representation

The purpose of the next derivation is to express unknown distance 160, noted as $A_1 A_2$, as a function of known (i.e., satellite related) parameters.

$$\overrightarrow{A_1 A_2} \cdot (\overrightarrow{u_{1,i}} + \overrightarrow{u_{2,j}}) = (\overrightarrow{OA_2} - \overrightarrow{OA_1}) \cdot (\overrightarrow{u_{1,i}} + \overrightarrow{u_{2,j}})$$

Using equations (1) to (4), this equation is rewritten as:

$$\overrightarrow{A_1 A_2} \cdot (\overrightarrow{u_{1,i}} + \overrightarrow{u_{2,j}}) = \overrightarrow{u_{2,j}} \cdot \overrightarrow{OS_{2,j}} - \rho_{2,j} + e_2 + e_{2,j} -$$
$$(\overrightarrow{u_{1,i}} \cdot \overrightarrow{OS_{1,i}} - \rho_{1,i} + e_1 + e_{1,i}) + \overrightarrow{OA_2} \cdot \overrightarrow{u_{1,i}} - \overrightarrow{OA_1} \cdot \overrightarrow{u_{2,j}}$$

By further decomposing $\overrightarrow{OA_2}$ and $\overrightarrow{OA_1}$ through $S_2$ and $S_1$ respectively, the following equation is obtained:

$$(\overrightarrow{u_{1,i}} + \overrightarrow{u_{2,j}}) \cdot \overrightarrow{A_1 A_2} =$$
$$(\overrightarrow{u_{1,i}} + \overrightarrow{u_{2,j}}) \cdot \overrightarrow{S_{1,i} S_{2,j}} + (1 + \overrightarrow{u_{1,i}} \cdot \overrightarrow{u_{2,j}})[(\rho_{1,i} - e_1 - e_{1,i}) - (\rho_{2,j} - e_2 - e_{2,j})]$$

Separating unknown (i.e., user related) and known variables finally leads to:

$$(\overrightarrow{u_{1,i}} + \overrightarrow{u_{2,j}}) \cdot \overrightarrow{A_1 A_2} + (1 + \overrightarrow{u_{1,i}} \cdot \overrightarrow{u_{2,j}})(e_1 - e_2) = \tag{7}$$
$$(1 + \overrightarrow{u_{1,i}} \cdot \overrightarrow{u_{2,j}})(\rho_{1,i} - \rho_{2,j} - e_{1,i} + e_{2,j}) + (\overrightarrow{u_{1,i}} + \overrightarrow{u_{2,j}}) \cdot \overrightarrow{S_{1,i} S_{2,j}}$$

The left hand side of this equation features users' relative position and its associated error; the right hand side, observable data.

Matrix Representation

Let X be a four-dimensioned vector, the first three components of which represent $\overrightarrow{A_1 A_2}$ coordinates and the fourth, the error component $e = e_1 - e_2$.

$$X = \begin{bmatrix} x \\ y \\ z \\ e \end{bmatrix}$$

When i and j vary, the preceding set of equations, exhibited in a generic fashion in Eq. (5), can be expressed as WX=O, where W is seen as a weighted coefficients matrix and O, as an observed parameters vector. W is a np×4 matrix and O, a np×1 matrix, n being the number of satellites in view from aircraft 150 and p, the number of satellites in view from aircraft 170.

$$W = \begin{bmatrix} w_{1,1} \\ \vdots \\ w_{1,j} \\ \vdots \\ w_{1,p} \\ \vdots \\ w_{i,1} \\ \vdots \\ w_{i,j} \\ \vdots \\ w_{i,p} \\ \vdots \\ w_{n,1} \\ \vdots \\ w_{n,j} \\ \vdots \\ w_{n,p} \end{bmatrix} \quad O = \begin{bmatrix} o_{1,1} \\ \vdots \\ o_{1,j} \\ \vdots \\ o_{1,p} \\ \vdots \\ o_{i,1} \\ \vdots \\ o_{i,j} \\ \vdots \\ o_{i,p} \\ \vdots \\ o_{n,1} \\ \vdots \\ o_{n,j} \\ \vdots \\ o_{n,p} \end{bmatrix}$$

Generic elements of arrays W and O, $w_{i,j}$ and $o_{i,j}$, are defined as follows:

$$w_{i,j} = \overrightarrow{^t u_{1,i}} + \overrightarrow{^t u_{2,j}} + \begin{vmatrix} 0 \\ 0 \\ 0 \\ (1 + \overrightarrow{u_{1,i}} \cdot \overrightarrow{u_{2,j}}) \end{vmatrix}$$
$$\quad \underbrace{\phantom{xxxxxxxxxxxx}}_{4^{th} \text{ dimension added}}$$

$$o_{i,j} = (1 + \overrightarrow{u_{1,i}} \cdot \overrightarrow{u_{2,j}})(\rho_{1,i} - \rho_{2,j} - e_{1,i} + e_{2,j}) + (\overrightarrow{u_{1,i}} \cdot \overrightarrow{u_{2,j}}) \cdot \overrightarrow{S_{1,i} S_{2,j}}$$

In step 250, the system is solved using the pseudo-inverse matrix $\Psi = (^t W\, W)^{-1}\, ^t W$.

$$X = \Psi O \qquad (8)$$

This solution represents a least squares approximation of the linear system under consideration. It should be clear nevertheless that other solving algorithms, for instance a total least squares method, could be used instead without departing from what step 250 is aiming at.

In FIG. 3, the performance of relative versus absolute navigation techniques is illustrated. Histogram 310 represents a distribution of distances between aircraft 150 and 170 which were computed through standard absolute positioning techniques involving a final step differentiation. Best-fitting gaussian curve 320 is determined using the mean (i.e. average of all distances) and standard deviation (characterizing the dispersion of a distribution) of histogram 310. Similarly, histogram 330 represents a distribution of distances between aircraft 150 and 170 which were computed through relative positioning techniques and curve 340, its associated best-fitting gaussian curve. In this example, an improvement of more than 50% was achieved.

$$\mu_{abs} = 10.583 \text{ km} \quad \sigma_{abs} = 15.85 \text{ m}$$
$$\mu_{rel} = 10.587 \text{ km} \quad \sigma_{rel} = 7.55 \text{ m}$$

Yet another application of this invention resides in the calculation of differentially corrected relative positions, as is the case within local and wide area augmentation systems (LAAS and WAAS) as well as their European counterpart EGNOS (European Geostationary Navigation Overlay Service).

While the invention has been particularly shown and described with reference to a preferred embodiment thereof, it will be understood by those skilled in the art that various changes in form and details may be made therein without betraying the spirit and scope of the invention as defined in the appended claims.

We claim:

1. A method for determining the relative position between a first receiver and a second receiver using a satellite-based navigation system utilizing a constellation of navigation satellites and a communication link between the first receiver and the second receiver, the method comprising the steps of:

receiving, from a first plurality of satellites of the constellation of navigation satellites, a first plurality of navigation signals at the first receiver;

receiving, from a second plurality of satellites of the constellation of navigation satellites, a second plurality of navigation signals at the second receiver;

computing, at the first receiver, a position estimate of the first receiver;

computing, at the second receiver, a position estimate of the second receiver;

transmitting from the second receiver to the first receiver, through the communication link, the second plurality of navigation signals and the position estimate of the second receiver;

computing, at the first receiver, a plurality of satellite positions of the first and second pluralities of satellites;

computing, at the first receiver, a first plurality of unit vectors between the first receiver and the first plurality of satellites;

computing, at the first receiver, a second plurality of unit vectors between the second receiver and the second plurality of satellites;

extracting, at the first receiver, from the first plurality of navigation signals, a first plurality of raw pseudoranges between the first receiver and each of the first plurality of satellites;

extracting, at the first receiver from the second plurality of navigation signals, a second plurality of raw pseudoranges between the second receiver and each of the second plurality of satellites;

computing, at the first receiver, a first plurality of range equivalents of the clock offsets of each of the first plurality of satellites;

computing, at the first receiver, a second plurality of range equivalents of the clock offsets of each of the second plurality of satellites; and determining a precise relative position between the first receiver and the second receiver from the plurality of satellite positions of the first and second pluralities of satellites, the first and second pluralities of unit vectors, the first and second pluralities of raw pseudoranges, and the first and second pluralities of range equivalents of the clock offsets of each of the first and second pluralities of satellites, respectively.

2. The method of claim 1, wherein said satellite-based navigation system comprises a plurality of pseudolites.

3. A method for computing the relative position between a first receiver and a second receiver using a satellite-based navigation system having a constellation of navigation satellites and a communication link between the first receiver and the second receiver, the method comprising the steps of:

receiving, at the first receiver, from a first plurality of satellites of the constellation of navigation satellites, a first plurality of navigation signals;

receiving, at the second receiver, from a second plurality of satellites of the constellation of navigation satellites, a second plurality of navigation signals;

computing, at the first receiver, a first plurality of unit vectors between the first receiver and the first plurality of satellites;

computing, at the second receiver, a second plurality of unit vectors between the second receiver and the second plurality of satellites;

computing, at the first receiver, a plurality of satellite positions of the first and second pluralities of satellites;

extracting, at the first receiver, from the first plurality of navigation signals, a first plurality of raw pseudoranges between the first receiver and each of the first plurality of satellites;

extracting, at the second receiver, from the second plurality of navigation signals, a second plurality of raw pseudoranges between the second receiver and each of the second plurality of satellites;

computing, at the first receiver, a first plurality of range equivalents of the clock offsets of each of the first plurality of satellites;

computing, at the second receiver, a second plurality of range equivalents of the clock offsets of each of the second plurality of satellites; and transmitting from the second receiver to the first receiver, through the communication link, the second plurality of unit vectors, the second plurality of raw pseudoranges, and the second plurality of range equivalents of the clock offsets of each of the second plurality of satellites;

determining a precise relative position between the first receiver and the second receiver from the plurality of satellite positions of the first and second pluralities of satellites, the first and second pluralities of unit vectors, the first and second pluralities of raw pseudoranges, and the first and second pluralities of range equivalents of the clock offsets of each of the first and second plurality of satellites, respectively.

4. The method of claim 3, wherein said satellite-based navigation system comprises a plurality of pseudolites.

5. An apparatus for determining the relative position between a first receiver and a second receiver using signals from a satellite-based navigation system utilizing a constellation of navigation satellites, the apparatus comprising:

a first receiver for receiving a first plurality of navigation signals from the constellation of navigation satellites;

a second receiver for receiving a second plurality of navigation signals from the constellation of navigation satellites;

means, coupled to said first receiver and the second receiver, for computing, based upon said first plurality of navigation signals and said second plurality of navigation signals, a first matrix comprising weighted coefficients, a second matrix comprising observable parameters and solving for the relative navigation equation position using said first matrix and said second matrix, where said first matrix of weighted coefficients comprises: where:

$$w_{i,j} = {}^t\overline{u_{1,i}} + {}^t\overline{u_{2,j}} + \begin{vmatrix} 0 \\ 0 \\ 0 \\ (1 + \overline{u_{1,i}} \cdot \overline{u_{2,j}}) \end{vmatrix}$$

where unit vectors are calculated as:

$$\overline{u_{2,j}} = \frac{A_2 S_{2,j}}{A_2 S_{2,j}}$$

$$W = \begin{bmatrix} w_{1,1} \\ \vdots \\ w_{1,j} \\ \vdots \\ w_{1,p} \\ \vdots \\ w_{i,1} \\ \vdots \\ w_{i,j} \\ \vdots \\ w_{i,p} \\ \vdots \\ w_{n,1} \\ \vdots \\ w_{n,j} \\ \vdots \\ w_{n,p} \end{bmatrix}$$

$$\overline{u_{1,i}} = \frac{A_1 S_{1,i}}{A_1 S_{1,i}}$$

where i and j vary between 1 and n, and 1 and p, respectively, where n represents a number of the first plurality of satellites, where p represents a number of the second plurality of satellites, $A_1$ denotes the position of the first receiver, $A_2$ denotes the position of the second receiver, $S_{1,i}$ denotes the position of an $i^{th}$ satellite in the first plurality of satellites, and $S_{2,j}$ denotes the position of a $j^{th}$ satellite in the second plurality of satellites.

6. The apparatus of claim 1, wherein said satellite-based navigation system comprises a plurality of pseudolites.

7. The method of claim 1, wherein said step of receiving, from a first plurality of satellites of the constellation of navigation satellites, a first plurality of navigation signals at the first receiver comprises the steps of:

receiving a first group of ephemeris data characterizing predetermined orbits of each of the first plurality of satellites of the constellation of navigation satellites; and receiving a first group of satellite time signals from each of the first plurality of satellites of the constellation of navigation satellites.

8. The method of claim 7, wherein said step of receiving, from a second plurality of satellites of the constellation of navigation satellites, a second plurality of navigation signals at the second receiver comprises the steps of:

receiving a second group of ephemeris data characterizing predetermined orbits of each of the second plurality of satellites of the constellation of navigation satellites; and receiving a second group of satellite time signals from each of the second plurality of satellites of the constellation of navigation satellites.

9. The method of claim 8, wherein said step of computing, at the first receiver, a position estimate of the first receiver comprises the step of:

generating a position estimate of the first receiver using an inertial navigation system.

10. The method of claim 9, wherein said step of computing, at the second receiver, a position estimate of the second receiver comprises the step of:

generating a position estimate of the second receiver using an inertial navigation system.

11. The method of claim 8, wherein said step of transmitting from the second receiver to the first receiver, through the communication link, the second plurality of navigation signals and the position estimate of the second receiver comprises the steps of:

transmitting the second group of ephemeris data characterizing predetermined orbits of each of the second plurality of satellites of the constellation of navigation satellites from the second receiver to the first receiver; and transmitting the second group of satellite time signals from each of the second plurality of satellites of the constellation of navigation satellites from the second receiver to the first receiver.

12. The method of claim 11, wherein said step of computing, at the first receiver, a plurality of satellite positions of the first and second pluralities of satellites comprises the steps of:

computing positions of the first plurality of satellites from the first group of ephemeris data characterizing predetermined orbits of each of the first plurality of satellites of the constellation of navigation satellites; and computing positions of the second plurality of satellites from the second group of ephemeris data characterizing predetermined orbits of each of the second plurality of satellites of the constellation of navigation satellites.

13. The method of claim 12, wherein said step of computing, at the first receiver, a first plurality of unit vectors between the first receiver and each of the first plurality of satellites comprises the step of calculating each of the first plurality of unit vectors as:

$$\overline{u_{1,i}} = \frac{\overline{A_1 S_{1,i}}}{A_1 S_{1,i}}$$

where $A_1$ denotes the position of the first receiver, and $S_{1,i}$ denotes the position of an $i^{th}$ satellite in the first plurality of satellites.

14. The method of claim 13, wherein said step of computing, at the first receiver, a second plurality of unit vectors between the second receiver and each of the second plurality of satellites comprises the step of calculating each of the second plurality of unit vectors as:

$$\overline{u_{2,j}} = \frac{\overline{A_2 S_{2,j}}}{A_2 S_{2,j}}$$

where $A_2$ denotes the position of the second receiver, and $S_{2,j}$ denotes the position of a $j^{th}$ satellite in the second plurality of satellites.

15. The method of claim 14, wherein said step of extracting, at the first receiver, a first plurality of raw pseudoranges between the first receiver and each of the first plurality of satellites from the first plurality of navigation signals comprises the steps of:

measuring differences between a clock signal generated at the first receiver and the first group of satellite time signals from each of the first plurality of satellites of the constellation of navigation satellites to measure a first group of propagation times for the first plurality of navigation signals from each of the first plurality of satellites; and multiplying each of the first group of propagation times by the speed of light to produce a first group of raw pseudoranges between the first receiver and each of the first group of satellites.

16. The method of claim 15, wherein said step of extracting, at the first receiver, a second plurality of raw pseudoranges between the second receiver and the second plurality of satellites from the second plurality of navigation signals comprises the steps of:

measuring differences between a clock signal generated at the second receiver and the second group of satellite time signals from each of the second plurality of satellites of the constellation of navigation satellites to measure a second group of propagation times for the second plurality of navigation signals from each of the second plurality of satellites; and multiplying each of the second group of propagation times by the speed of light to produce a second group of raw pseudoranges between the second receiver and each of the second group of satellites.

17. The method of claim 16, wherein said step of computing, at the first receiver, a plurality of satellite positions of the first and second pluralities of satellites comprises the step of calculating a plurality of satellite positions for the first and second pluralities of satellites using the equations:

$$\cos v_k = \frac{\cos E_k - e}{1 - e \cos E_k}$$

$$\sin v_k = \frac{\sqrt{1-e^2} \sin E_k}{1 - e \cos E_k}$$

$$\cos \phi_k = \cos v_k \cos \omega - \sin v_k \sin \omega$$

$$\sin \phi_k = \sin v_k \cos \omega + \sin \omega \cos v_k$$

Where $k \in \{1, \ldots, 6\}$, e denotes eccentricity of elliptical orbits, $E_k$ denotes an eccentric anomaly of orbit, ω denotes an argument of perigee, ν denotes true anomaly of orbit, and $\phi_k$ denotes an argument of latitude.

18. The method of claim 17, wherein said step of determining a precise relative position between the first receiver and the second receiver comprises the step of determining the precise relative position between the first receiver and the second receiver from the plurality of satellite positions of the first and second pluralities of satellites, the first and second pluralities of unit vectors, the first and second pluralities of raw pseudoranges, and the first and second pluralities of range equivalents of the clock offsets of each of the first and second pluralities of satellites, respectively by solving the set of equations:

$$(\overline{u_{1,i}} + \overline{u_{2,j}}) \cdot \overline{A_1 A_2} + (1 + \overline{u_{1,i}} \cdot \overline{u_{2,j}})(e_1 - e_2) = (1 + \overline{u_{1,i}} \cdot \overline{u_{2,j}})$$
$$(\rho_{1,i} - \rho_{2,j} - e_{1,i} + e_{2,j}) + (\overline{u_{1,i}} + \overline{u_{2,j}}) \cdot \overline{S_{1,i} S_{2,j}}$$

where $A_1$ denotes the position of the first receiver, $A_2$ denotes the position of the second receiver, $S_{1,i}$ denotes the position of an $i^{th}$ satellite in the first plurality of satellites, $S_{2,j}$ denotes the position of a $j^{th}$ satellite in the second plurality of satellites, $\rho_{1,i}$ denotes a pseudorange between the first receiver and an $i^{th}$ satellite in the first plurality of satellites, $\rho_{2,j}$ denotes a pseudorange between the second receiver and a $j^{th}$ satellite in the second plurality of satellites, $e_1$ denotes a range equivalent for a first receiver clock offset, and $e_2$ denotes a range equivalent for a second receiver clock offset, $e_{1,i}$ denotes a range equivalent of a clock offset of an $i^{th}$ satellite of first plurality of satellites, $e_{2,j}$ denotes a range equivalent of a clock offset of an $j^{th}$ satellite of second plurality of satellites, and where i and j vary between 1 and n, and 1 and p, respectively, where n represents a number of the first plurality of satellites, and where p represents a number of the second plurality of satellites.

19. The method of claim 3, wherein said step of receiving, from a first plurality of satellites of the constellation of navigation satellites, a first plurality of navigation signals at the first receiver comprises the steps of:

receiving a first group of ephemeris data characterizing predetermined orbits of each of the first plurality of satellites of the constellation of navigation satellites; and receiving a first group of satellite time signals from each of the first plurality of satellites of the constellation of navigation satellites.

20. The method of claim 19, wherein said step of receiving, from a second plurality of satellites of the constellation of navigation satellites, a second plurality of navigation signals at the second receiver comprises the steps of:

receiving a second group of ephemeris data characterizing predetermined orbits of each of the second plurality of satellites of the constellation of navigation satellites; and receiving a second group of satellite time signals from each of the second plurality of satellites of the constellation of navigation satellites.

21. The method of claim 20, wherein said step of computing, at the first receiver, a first plurality of unit vectors between the first receiver and each of the first plurality of satellites comprises the step of calculating each of the first plurality of unit vectors as:

$$\overline{u_{1,i}} = \frac{\overline{A_1 S_{1,i}}}{A_1 S_{1,i}}$$

where $A_1$ denotes the position of the first receiver, and $S_{1,i}$ denotes the position of an $i^{th}$ satellite in the first plurality of satellites.

22. The method of claim 21, wherein said step of computing, at the second receiver, a second plurality of unit vectors between the second receiver and each of the second plurality of satellites comprises the step of calculating each of the second plurality of unit vectors as:

$$\overline{u_{2,j}} = \frac{\overline{A_2 S_{2,j}}}{A_2 S_{2,j}}$$

where $A_2$ denotes the position of the second receiver, and $S_{2,j}$ denotes the position of a $j^{th}$ satellite in the second plurality of satellites.

23. The method of claim 22, wherein said step of extracting, at the first receiver, a first plurality of raw pseudoranges between the first receiver and each of the first plurality of satellites from the first plurality of navigation signals comprises the steps of:

measuring differences between a clock signal generated at the first receiver and the first group of satellite time signals from each of the first plurality of satellites of the constellation of navigation satellites to measure a first group of propagation times for the first plurality of navigation signals from each of the first plurality of satellites; and multiplying each of the first group of propagation times by the speed of light to produce a first group of raw pseudoranges between the first receiver and each of the first group of satellites.

24. The method of claim 23, wherein said step of extracting, at the second receiver, a second plurality of raw pseudoranges between the second receiver and each of the second plurality of satellites from the second plurality of navigation signals comprises the steps of:

measuring differences between a clock signal generated at the second receiver and the second group of satellite time signals from each of the second plurality of satellites of the constellation of navigation satellites to measure a second group of propagation times for the second plurality of navigation signals from each of the second plurality of satellites; and multiplying each of the second group of propagation times by the speed of light to produce a second group of raw pseudoranges between the second receiver and each of the second group of satellites.

25. The method of claim 24, wherein said step of computing, at the first receiver, a plurality of satellite positions of the first and second pluralities of satellites comprises the step of calculating a plurality of satellite positions of the first and second pluralities of satellites using the equations:

$$\cos v_k = \frac{\cos E_k - e}{1 - e\cos E_k}$$

$$\sin v_k = \frac{\sqrt{1-e^2}\,\sin E_k}{1 - e\cos E_k}$$

$$\cos \phi_k = \cos v_k \cos \omega - \sin v_k \sin \omega$$

$$\sin \phi_k = \sin v_k \cos \omega + \sin \omega \cos v_k$$

Where $k \in \{1, \ldots, 6\}$, $e$ denotes eccentricity of elliptical orbits, $E_k$ denotes an eccentric anomaly of orbit, $\omega$ denotes an argument of perigee, $v$ denotes true anomaly of orbit, and $\phi_k$ denotes an argument of latitude.

26. The method of claim 25, wherein said step of determining a precise relative position between the first receiver and the second receiver from the plurality of satellite positions of the first and second pluralities of satellites, the first and second pluralities of unit vectors, the first and second pluralities of raw pseudoranges, and the first and second pluralities of range equivalents of the clock offsets of each of the first and second pluralities of satellites, respectively, by solving the set of equations:

$$(\overline{u_{1,i}+u_{2,j}})\cdot\overline{A_1A_2}+(1+\overline{u_{1,i}}\cdot\overline{u_{2,j}})(e_1-e_2)=(1+\overline{u_{1,i}\cdot 2j})$$

$$(\rho_{1,i}-\rho_{2,j}-e_{1,i}+e_{2,j})+(\overline{u_{1,i}+u_{2,j}})\cdot\overline{S_{1,i}S_{2,j}}$$

where $A_1$ denotes the position of the first receiver, $A_2$ denotes the position of the second receiver, $S_{1,i}$ denotes the position of an $i^{th}$ satellite in the first plurality of satellites, $S_{2,j}$ denotes the position of a $j^{th}$ satellite in the second plurality of satellites, $\rho_{1,i}$ denotes a pseudorange between the first receiver and an $i^{th}$ satellite in the first plurality of satellites, $\rho_{2,j}$ denotes a pseudorange between the second receiver and a $j^{th}$ satellite in the second plurality of satellites, $e_1$ denotes a range equivalent for a first receiver clock offset, and $e_2$ denotes a range equivalent for a second receiver clock offset, $e_{1,i}$ denotes a range equivalent of a clock offset of an $i^{th}$ satellite of first plurality of satellites, $e_{2,j}$ denotes a range equivalent of a clock offset of an $j^{th}$ satellite of second plurality of satellites, and where i and j vary between 1 and n, and 1 and p, respectively, where n represents a number of the first plurality of satellites, and where p represents a number of the second plurality of satellites.

27. An apparatus for determining the relative position between two points, comprising:

a first receiver located at a first point, for receiving signals from a first plurality of satellites of a satellite-based navigation system having a constellation of navigation satellites;

a second receiver located at a second point, for receiving signals from a second plurality of satellites of the satellite-based navigation system having a constellation of navigation satellites;

a communication link between the first receiver and the second receiver, wherein the first receiver further includes:

means for receiving, from a first plurality of satellites of the constellation of navigation satellites, a first plurality of navigation signals at the first receiver;

means for computing a position estimate of the first receiver;

means for computing a plurality of satellite positions of the first and second pluralities of satellites;

means for transmitting from the first receiver to the second receiver, through the communication link, the first plurality of navigation signals and the position estimate of the first receiver, and wherein the second receiver further includes:

means for receiving, from a second plurality of satellites of the constellation of navigation satellites, a second plurality of navigation signals at the second receiver;

means for computing a position estimate of the second receiver;

means for computing a first plurality of unit vectors between the first receiver and each of the first plurality of satellites;

means for computing a second plurality of unit vectors between the second receiver and each of the second plurality of satellites;

means for extracting from the first plurality of navigation signals, a first plurality of raw pseudoranges between the first receiver and each of the first plurality of satellites;

means for extracting from the second plurality of navigation signals, a second plurality of raw pseudoranges between the second receiver and each of the second plurality of satellites;

means for computing a first plurality of range equivalents of the clock offsets of each of the first plurality of satellites;

means for computing a second plurality of range equivalents of the clock offsets of each of the second plurality of satellites; and means for determining a precise relative position between the first receiver and the second receiver from the pluralities of satellites, the first and second pluralities of unit vectors, the first and second pluralities of raw pseudoranges, and the first and second pluralities of range equivalents of the clock offsets of each of the first and second pluralities of satellites, respectively.

28. The apparatus of claim 27, wherein said means for receiving, from a first plurality of satellites of the constellation of navigation satellites, a first plurality of navigation signals at the first receiver comprises:

means for receiving a first group of ephemeris data characterizing predetermined orbits of each of the first plurality of satellites of the constellation of navigation satellites; and means for receiving a first group of satellite time signals from each of the first plurality of satellites of the constellation of navigation satellites.

29. The apparatus of claim 28, wherein said means for receiving, from a second plurality of satellites of the constellation of navigation satellites, a second plurality of navigation signals at the second receiver comprises:

means for receiving a second group of ephemeris data characterizing predetermined orbits of each of the second plurality of satellites of the constellation of navigation satellites; and means for receiving a second group of satellite time signals from each of the second plurality of satellites of the constellation of navigation satellites.

30. The apparatus of claim 29, wherein said means for computing a position estimate of the first receiver comprises:

means for generating a position estimate of the first receiver using an inertial navigation system.

31. The apparatus of claim 30, wherein said means for computing a position estimate of the second receiver comprises:

means for generating a position estimate of the second receiver using an inertial navigation system.

32. The apparatus of claim 31, wherein said means for transmitting from the first receiver to the second receiver, through the communication link, the second plurality of navigation signals and the position estimate of the second receiver comprises:

means for transmitting the second group of ephemeris data characterizing predetermined orbits of each of the second plurality of satellites of the constellation of navigation satellites from the second receiver to the first receiver; and means for transmitting the second group of satellite time signals from each of the second plurality of satellites of the constellation of navigation satellites from the second receiver to the first receiver.

33. The apparatus of claim 32, wherein said means for computing a plurality of satellite positions of the first and second pluralities of satellites comprises:

means for computing positions of the first plurality of satellites from the first group of ephemeris data characterizing predetermined orbits of each of the first plurality of satellites of the constellation of navigation satellites; and means for computing position of the second plurality of satellites from the second group of ephemeris data characterizing predetermined orbits of each of the second plurality of satellites of the constellation of navigation satellites.

34. The apparatus of claim 33, wherein said means for computing a first plurality of unit vectors between the first receiver and each of the first plurality of satellites comprises means for calculating each of the first plurality of unit vectors as:

$$\overline{u_{1,i}} = \frac{\overline{A_1 S_{1,i}}}{A_1 S_{1,i}}$$

where $A_1$ denotes the position of the first receiver, and $S_{1,i}$ denotes the position of an $i^{th}$ satellite in the first plurality of satellites.

35. The apparatus of claim 34, wherein said means for computing a second plurality of unit vectors between the second receiver and each of the second plurality of satellites comprises calculating each of the second plurality of unit vectors as:

$$\overline{u_{2,j}} = \frac{\overline{A_2 S_{2,j}}}{A_2 S_{2,j}}$$

where $A_2$ denotes the position of the second receiver, and $S_{2,j}$ denotes the position of a $j^{th}$ satellite in the second plurality of satellites.

36. The apparatus of claim 35, wherein said means for extracting from the first plurality of navigation signals, a first plurality of raw pseudoranges between the first receiver and each of the first plurality of satellites comprises:

means for measuring differences between a clock signal generated at the first receiver and the first group of satellite time signals from each of the first plurality of satellites of the constellation of navigation satellites to measure a first group of propagation times for the first plurality of navigation signals from each of the first plurality of satellites; and means for multiplying each of the first group of propagation times by the speed of light to produce a first group of raw pseudoranges between the first receiver and each of the first group of satellites.

37. The apparatus of claim 36, wherein said means for extracting from the second plurality of navigation signals, a second plurality of raw pseudoranges between the second receiver and the second plurality of satellites comprises:

means for measuring differences between a clock signal generated at the second receiver and the second group of satellite time signals from each of the second plurality of satellites of the constellation of navigation satellites to measure a second group of propagation times for the second plurality of navigation signals from each of the second plurality of satellites; and means for multiplying each of the second group of propagation times by the speed of light to produce a second group of raw pseudoranges between the second receiver and each of the second group of satellites.

38. The apparatus of claim 37, wherein the first receiver further comprises:

means for computing a first plurality of range equivalents of the clock offsets of each of the first plurality of satellites.

39. The apparatus of claim 38, wherein the second receiver further comprises:

means for computing a second plurality of range equivalents of the clock offsets of each of the second plurality of satellites.

40. The apparatus of claim 39, wherein said means for determining a precise relative position between the first receiver and the second receiver comprises means for determining the precise relative position between the first receiver and the second receiver from the plurality of satellite positions of the first and second pluralities of satellites, the first and second pluralities of unit vectors, the first and second pluralities of raw pseudoranges, and the first and second pluralities of range equivalents of the clock offsets of each of the first and second pluralities of satellites, respectively by solving the set of equations:

$$(\overline{u_{1,i}} + \overline{u_{2,j}}) \cdot \overline{A_1 A_2} + (1 + \overline{u_{1,i}} \cdot \overline{u_{2,j}})(e_1 e_2) = 1 + \overline{u_{1,i}} \cdot \overline{u_{2,j}}$$

$$(\rho_{1,i} - \rho_{2,j} - e_{1,i} + e_{2,j}) + (\overline{u_{1,i}} + \overline{u_{2,j}}) \cdot \overline{S_{1,i} S_{2,j}}$$

where $A_1$ denotes the position of the first receiver, $A_2$ denotes the position of the second receiver, $S_{1,i}$ denotes the position of an $i^{th}$ satellite in the first plurality of satellites, $S_{2,j}$ denotes the position of a $j^{th}$ satellite in the second plurality of satellites, $\rho_{1,i}$ denotes a pseudorange between the first receiver and an $i^{th}$ satellite in the first plurality of satellites, $\rho_{2,j}$ denotes a pseudorange between the second receiver and a $j^{th}$ satellite in the second plurality of satellites, $e_1$ denotes a range equivalent for a first receiver clock offset, and $e_2$ denotes a range equivalent for a second receiver clock offset, $e_{1,i}$ denotes a range equivalent of a clock offset of an $i^{th}$ satellite of first plurality of satellites, $e_{2,j}$ denotes a range equivalent of a clock offset of an $j^{th}$ satellite of second plurality of satellites, and where i and j vary between 1 and n, and 1 and p, respectively, where n represents a number of the first plurality of satellites, and where p represents a number of the second plurality of satellites.

41. A apparatus for computing the relative position between two points, comprising:

a first receiver located at a first point, for receiving signals from a satellite-based navigation system having a constellation of navigation satellites;

a second receiver located at a second point, for receiving signals from a satellite-based navigation system having a constellation of navigation satellites; and a communication link between the first receiver and the second receiver, wherein the first receiver includes:

means for receiving, from a first plurality of satellites of the constellation of navigation satellites, a first plurality of navigation signals;

means for computing a first plurality of unit vectors between the first receiver and each of the first plurality of satellites;

means for computing a plurality of satellite positions of the first and second pluralities of satellites;

means for extracting from the first plurality of navigation signals, a first plurality of raw pseudoranges between the first receiver and each of the first plurality of satellites;

means for computing a first plurality of range equivalents of the clock offsets of each of the first plurality of satellites;

means for transmitting from the first receiver to the second receiver, through the communication link, the first plurality of unit vectors, the first plurality of raw pseudoranges, and the first plurality of range equivalents of the clock offsets of each of the first plurality of satellites, and wherein the second receiver includes:

means for receiving, from a second plurality of satellites of the constellation of navigation satellites, a second plurality of navigation signals;

means for computing a second plurality of unit vectors between the second receiver and each of the second plurality of satellites;.

means for extracting from the second plurality of navigation signals, a second plurality of raw pseudoranges between the first receiver and each of the second plurality of satellites;

means for computing a second plurality of range equivalents of the clock offsets of each of the second plurality of satellites; and means for determining a precise relative position between the first receiver and the second receiver from the plurality of satellite positions of the first and second pluralities of satellites, the first and second pluralities of unit vectors, the first and second pluralities of raw pseudoranges, and the first and second pluralities of range equivalents of the clock offsets of each of the first and second pluralities of satellites, respectively.

42. The apparatus of claim 41, wherein said means for receiving, from a first plurality of satellites of the constellation of navigation satellites, a first plurality of navigation signals comprises:

means for receiving a first group of ephemeris data characterizing predetermined orbits of each of the first plurality of satellites of the constellation of navigation satellites; and means for receiving a first group of satellite time signals from each of the first plurality of satellites of the constellation of navigation satellites.

43. The apparatus of claim 42, wherein said means for receiving, from a second plurality of satellites of the constellation of navigation satellites, a second plurality of navigation signals comprises:

means for receiving a second group of ephemeris data characterizing predetermined orbits of each of the second plurality of satellites of the constellation of navigation satellites; and means for receiving a second group of satellite time signals from each of the second plurality of satellites of the constellation of navigation satellites.

44. The apparatus of claim 43, wherein said means for computing a first plurality of unit vectors between the first receiver and each of the first plurality of satellites comprises means for calculating each of the first plurality of unit vectors as:

$$\overline{u_{1,i}} = \frac{\overline{A_1 S_{1,i}}}{A_1 S_{1,i}}$$

where $A_1$ denotes the position of the first receiver, and $S_{1,i}$ denotes the position of an $i^{th}$ satellite in the first plurality of satellites.

45. The apparatus of claim 44, wherein said means for computing a second plurality of unit vectors between the second receiver and each of the second plurality of satellites comprises means for calculating each of the second plurality of unit vectors as:

$$\overline{u_{2,j}} = \frac{\overline{A_2 S_{2,j}}}{A_2 S_{2,j}}$$

where $A_2$ denotes the position of the second receiver, and where $S_{2,j}$ denotes the position of a $j^{th}$ satellite in the second plurality of satellites.

46. The apparatus of claim 45, wherein said means for extracting from the first plurality of navigation signals, a first plurality of raw pseudoranges between the first receiver and each of the first plurality of satellites comprises:

means for measuring differences between a clock signal generated at the first receiver and the first group of satellite time signals from each of the first plurality of satellites of the constellation of navigation satellites to measure a first group of propagation times for the first plurality of navigation signals from each of the first plurality of satellites; and means for multiplying each of the first group of propagation times by the speed of light to produce a first group of raw pseudoranges between the first receiver and each of the first group of satellites.

47. The apparatus of claim 46, wherein said means for extracting from the second plurality of navigation signals, a second plurality of raw pseudoranges between the second receiver and each of the second plurality of satellites comprises:

means for measuring differences between a clock signal generated at the second receiver and the second group of satellite time signals from each of the second plurality of satellites of the constellation of navigation satellites to measure a second group of propagation times for the second plurality of navigation signals from each of the second plurality of satellites; and means for multiplying each of the second group of propagation times by the speed of light to produce a second group of raw pseudoranges between the second receiver and each of the second group of satellites.

48. The apparatus of claim 47, wherein said first receiver further comprises:

means for computing a first plurality of range equivalents of the clock offsets of each of the first plurality of satellites.

49. The apparatus of claim 48, wherein said second receiver further comprises:

means for computing a second plurality of range equivalents of the clock offsets of each of the second plurality of satellites.

50. The apparatus of claim 49, wherein said means for determining a precise relative position between the first receiver and the second receiver from the plurality of satellite positions of the first and second pluralities of satellites, the first and second pluralities of unit vectors, the first and second pluralities of raw pseudoranges, and the first and second pluralities of range equivalents of the clock offsets of each of the first and second pluralities of satellites, respectively by solving the set of equations:

$$(\overline{u_{1,i} + u_{2,j}}) \cdot \overline{A_1 A_2} + (1 + \overline{u_{1,i} \cdot u_{2,j}})(e_1 e_2) = (1 + \overline{u_{1,i} \cdot u_{2,j}})$$

$$(\rho_{1,i} - \rho_{2,j} - e_{1,i} + e_{2,j}) + (\overline{u_{1,i} + u_{2,j}}) \cdot \overline{S_{1,i} S_{2,j}}$$

where $A_1$ denotes the position of the first receiver, $A_2$ denotes the position of the second receiver, $S_{1,i}$ denotes the position of an $i^{th}$ satellite in the first plurality of satellites, $S_{2,j}$ denotes the position of a $j^{th}$ satellite in the second plurality of satellites, $\rho_{1,i}$ denotes a pseudorange between the first receiver and an $i^{th}$ satellite in the first plurality of satellites, $\rho_{2,j}$ denotes a pseudorange between the second receiver and a $j^{th}$ satellite in the second plurality of satellites, $e_1$ denotes a range equivalent for a first receiver clock offset, and $e_2$ denotes a range equivalent for a second receiver clock offset, $e_{1,i}$ denotes a range equivalent of a clock offset of an $i^{th}$ satellite of first plurality of satellites, $e_{2,j}$ denotes a range equivalent of a clock offset of an $j^{th}$ satellite of second plurality of satellites, and where i and j vary between 1 and n, and 1 and p, respectively, where n represents a number of the first plurality of satellites, and where p represents a number of the second plurality of satellites.

51. The apparatus of claim 5 where said second matrix of observable parameters comprises:

$$O = \begin{bmatrix} o_{1,1} \\ \vdots \\ o_{1,j} \\ \vdots \\ o_{1,p} \\ \vdots \\ o_{i,1} \\ \vdots \\ o_{i,j} \\ \vdots \\ o_{i,p} \\ \vdots \\ o_{n,1} \\ \vdots \\ o_{n,j} \\ \vdots \\ o_{n,p} \end{bmatrix}$$

where:

$$o_{ij} = (1 + \overline{u_{1,i} \cdot u_{2,j}})(\rho_{1,i} - \rho_{2,j} - e_{1,i} + e_{2,j}) + (\overline{u_{1,i} + u_{2,j}}) \cdot \overline{S_{1,i} S_{2,j}}$$

where unit vectors are calculated as:

$$\overline{u_{2,j}} = \frac{\overline{A_2 S_{2,j}}}{A_2 S_{2,j}}$$

where i and j vary between 1 and n, and 1 and p, respectively, where n represents a number of the first plurality of $$\overline{u_{1,i}} = \frac{\overline{A_1 S_{1,i}}}{A_1 S_{1,i}}$$

satellites, where p represents a number of the second plurality of satellites, $A_1$ denotes the position of the first receiver, $A_2$ denotes the position of the second receiver, $S_{1,i}$ denotes the position of an $i^{th}$ satellite in the first plurality of satellites, $S_{2,j}$ denotes the position of a $j^{th}$ satellite in the second plurality of satellites, $\rho_{1,i}$ denotes a pseudorange between the first receiver and an $i^{th}$ satellite in the first plurality of satellites, $\rho_{2,j}$ denotes a pseudorange between the second receiver and a $j^{th}$ satellite in the second plurality of satellites, $e_{1,i}$ denotes a range equivalent of a clock offset of an $i^{th}$ satellite of first plurality of satellites, and $e_{2,j}$ denotes a range equivalent of a clock offset of an $j^{th}$ satellite of second plurality of satellites.

52. The apparatus of claim 51, where said means for computing solves the relative navigation equation system using said first matrix and said second matrix using the equation:

$$X = \Psi O$$

Where $$\Psi = (^tW\,W)^{-1}\,{}^tW.$$

* * * * *